June 24, 1969 L. V. BABCOCK 3,452,303
BANDPASS NETWORK HAVING A HIGH ATTENUATION REJECTION CHARACTERISTIC
Filed July 20, 1965 Sheet 1 of 2

INVENTOR
Leonard V. Babcock
By
Hofgren, Wegner, Allen, Stellman & McCord
ATTORNEYS United States Patent Office 3,452,303
Patented June 24, 1969

3,452,303

BANDPASS NETWORK HAVING A HIGH ATTENUATION REJECTION CHARACTERISTIC

Leonard V. Babcock, Arlington Heights, Ill., assignor to Warwick Electronics Inc., a corporation of Delaware Filed July 20, 1965, Ser. No. 473,430
Int. Cl. H01h 7/10; H01p 5/12; H04n 7/04
U.S. Cl. 333—76 4 Claims

ABSTRACT OF THE DISCLOSURE

A bandpass network including mutually coupled inductances having a common junction, and an absorption trap coupled to the common junction and forming a circuit which is series resonant at a frequency slightly below the frequency to be rejected by the network, and parallel resonant at a frequency below the resonant frequency of the series tuned circuit.

This invention relates to a bandpass network having a rejection characteristic, and more particularly to a bandpass network having an absorption trap which provides a low impedance shunt path for a signal at a specific frequency.

In certain broadly tuned signal coupling networks, a signal at a specific frequency in the vicinity of the passband of the network must be rejected without affecting other signals in the passband. For example, between the tuner and first IF stage of a color television signal receiver, signals occurring in a frequency range from approximately 41.5 to 46.25 megacycles should be essentially unaffected by the circuits that remove the adjacent sound signal at 47.25 megacycles from the passband. In the signal coupling network between the IF stage and the sync-luminance stages of the receiver, it may also be desirable to attenuate the accompanying sound signal at 41.25 megacycles.

A principal object of this invention is to provide an improved bandpass network, having a trap circuit for strongly rejecting a specific frequency while maintaining the desired passband of the network.

Another object of this invention is to provide a bandpass network, having a circuit coupled thereto which provides a low impedance shunt path at a specific frequency.

One feature of this invention is the provision of a bandpass network including mutually coupled inductances having a common junction point. A circuit coupled to the junction point is series resonant at a frequency slightly below the frequency to be trapped, providing an inductive reactance at the trap frequency substantially equal to the negative inductive reactance reflected in the effective signal path of the circuit by the mutually coupled inductances.

Another feature of this invention is the provision of a bandpass network having a circuit coupled thereto which is series resonant at a frequency slightly below the frequency to be trapped, and parallel resonant at a frequency below the resonant frequency of the series tuned circuit, for absorbing signals at the trap frequency while maintaining proper band width of the bandpass network at the frequencies of the remaining signals.

Yet another feature of this invention is the provision of a bandpass network having means for trapping undesired signals with an economical null adjustment for the trap frequency, consisting of a variable coil as opposed to a variable resistor.

Further features and advantages of the invention will become apparent from the following specification and from the drawings, in which:

FIGURE 4 is a schematic diagram of another embodiment of the invention;

Figure 1:
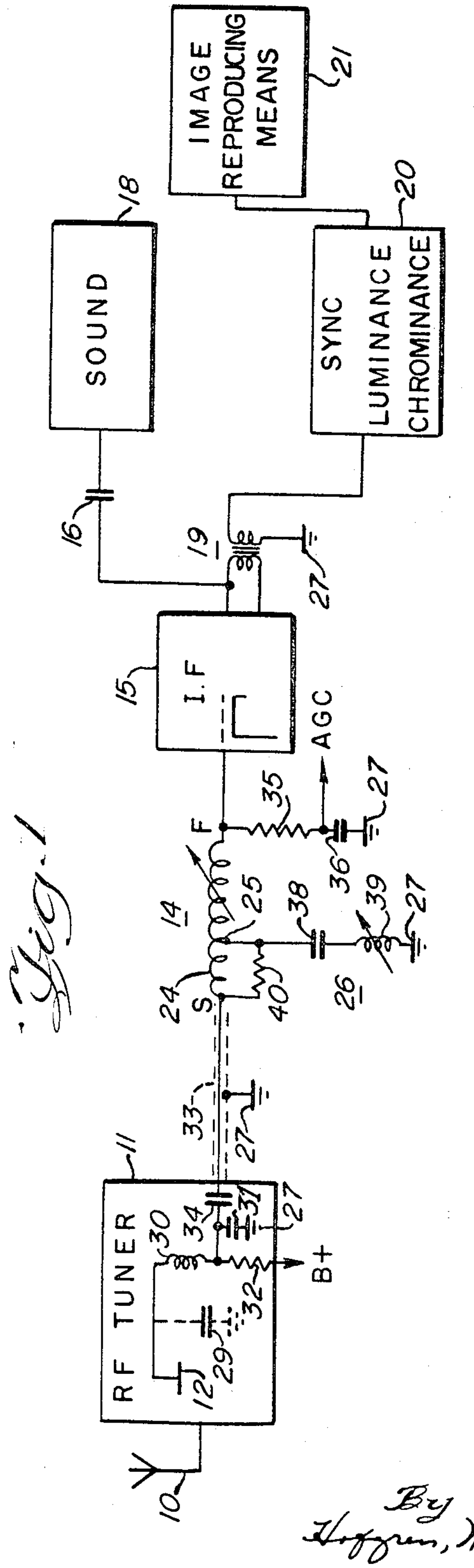
FIGURE 1 is a schematic diagram of a filter network embodying the invention.

While illustrative embodiments of the invention are shown in the drawings and will be disclosed in detail herein, the invention is susceptible of embodiment in several different forms and it should be understood that the present disclosure is to be considered as an exemplification of the principles of the invention and is not intended to limit the invention to the embodiments illustrated. Throughout the specification, values will be given for the components in order to disclose a complete, operative embodiment of the invention. However, it is to be understood that such values are merely representative and are not critical unless specifically so stated. The scope of the invention will be pointed out in the appended claims.

A color television signal receiver is illustrated by the block diagram of FIGURE 1. An antenna 10 couples a television signal to an RF tuner unit 11 which typically includes an RF amplifier, an oscillator, and a mixer. The output from the mixer, which may be taken from the plate 12 of the mixer tube is coupled through a bandpass network 14, to be described in more detail hereinafter, to the first IF tube in an IF amplifier stage 15. The composite television signal is coupled from the IF stage through a capacitor 16, to the sound stage 18 of the receiver and through a transformer 19 to the chrominance-sync-luminance stages 20 of the receiver. The outputs of these stages are coupled to an image reproducing means 21, as a conventional color dot picture tube.

The converter output circuit with network 14 form a bandpass circuit for IF signals. An inductor 24 is connected in series between tuner 11 and IF stage 15. Inductor 24 is constructed so that the start S to tap T at a point 25, and tap to finish F windings are mutually aiding. The tapped inductor may be formed from a pair of mutually coupled inductors having a common junction point corresponding to tap 25.

The value of inductor 24 is chosen to resonate with the input capacity of IF stage 15 and to provide an impedance step up to the IF stage.

The IF signal from plate 12 is developed across a tuned circuit primarily formed by the effective plate-to-ground capacity 29 for the mixer tube, an inductor 30, and a 100 picofarad capacitor 31. A plate resistor 32 is connected to a source of high voltage B+. Capacitor 31 has a low impedance at the frequency of IF signals. The start S of inductor 24 is coupled to this low impedance point through a shielded cable 33 and a 1000 picofarad capacitor 34.

The finish F of inductor 24 is coupled to the grid of the first IF tube, which has a high input impedance. AGC voltage for the television receiver is available at the junction of a series connected 3 kilohm resistor 35 and a capacitor 36.

Tap 25 is located on inductor 24 near the start S to provide a low impedance for the insertion of the rejection circuitry.

Figure 2:
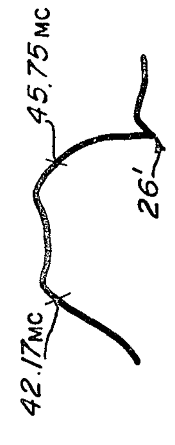
FIGURE 2 is a diagram illustrating the overall bandpass characteristic of the network of FIGURE 1.

The overall frequency response curve for bandpass network 14 is illustrated in FIGURE 2. The curve is essentially flat from 42.17 to 45.75 megacycles. Above 45.75 megacycles, the frequency response rapidly falls off, having a sharp notch or null at a point 26', caused by shunt circuit 26, as will be described in detail hereinafter.

The following procedure is used to adjust the frequency response of network 14 to a desired shape. The output of a sweep generator, sweeping frequencies from approximately 40 to 50 megacycles, is coupled to the circuit before mixer plate 12. An oscilloscope is coupled to the output of the first IF tube, and displays a pattern similar to FIGURE 2. The value of inductor 30 tends to vary the high end response of the curve, adjacent 45.75 megacycles. The value of inductor 30 is chosen to provide the desired shape of the high end of the curve. The value of inductor 24 tends to effect the low end. By varying inductor 24, the overall curve is "rocked." Adjustment of inductor 39 controls the trap frequency. By adjusting the values of inductors 30, 24 and 39, the desired response shape is obtained.

Figure 3:
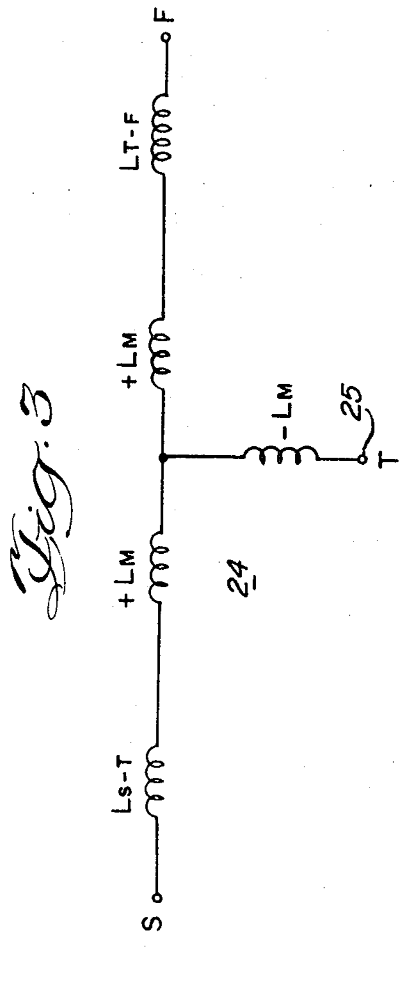
FIGURE 3 is an equivalent circuit of the mutually coupled inductances of FIGURE 1.
Figure 1:
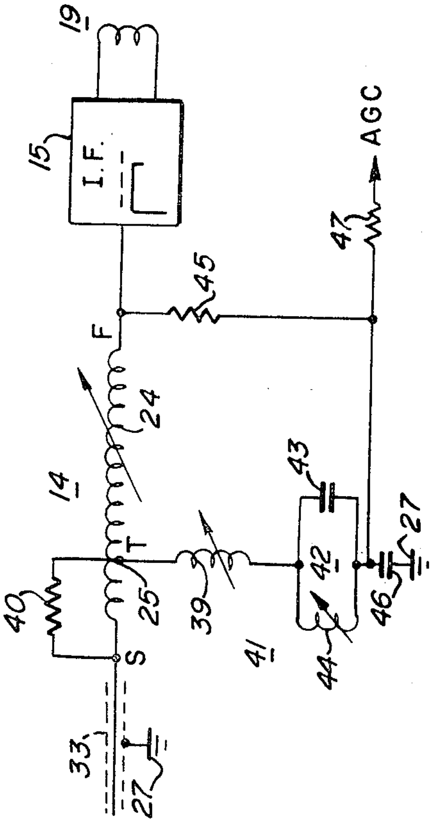

The equivalent circuit of inductor 24 is illustrated in FIGURE 3. An inductor $L_{S-T}$, representative of the inductance from start to tap, and an inductor $L_{T-F}$, representative of the inductances from tap to finish, in series with inductors $L_M$, representative of the mutual inductance, form a direct signal path from S to F. A negative inductance $-L_M$ representative of the mutual inductance is reflected in an effective electrical signal path from the direct signal path, between S and F, to tap 25.

Returning to FIGURE 1, shunt circuit 26 consists of a 4.7 picofarad capacitor 38 and an inductor 39 which is series resonant at a frequency slightly below the frequency to be trapped. The L to C ratio of capacitor 38 and inductor 39 is chosen so that at the trap frequency, the impedance of circuit 26 is inductive and has a value equal to the $-L_M$ of the equivalent circuit.

A resistor 40 connected across inductor 24 from start S to tap 25 has a value so the effective negative resistance it reflects in series with $-L_M$ is equal to the positive resistance, caused by finite Q, of the series combination of capacitor 38 and inductor 39. This resistor may be made variable to compensate for variations in Q of inductor 39 and capacitor 38. As a result, the total impedance of the effective electrical signal path from inductor 24 to ground 27 is zero at the trap frequency, thereby rejecting the unwanted signal. In a practical bandpass network constructed with the component values given above, the adjacent sound signal 26' at 47.25 megacycles was in excess of 60 db down from the center of the IF passband if a close tolerance fixed resistor is used for resistor 40. If resistor 40 is made variable, greater attenuation is easily achieved.

The circuit illustrated in FIGURE 4 is a modification of the circuit described in conjunction with FIGURE 1, using a modified shunt circuit 41 in place of shunt circuit 26. The circuit of FIGURE 1 normally provides a signal coupling network with a very broad bandwidth when trapping the adjacent sound carrier. For some applications, a narrower bandwidth is desired. This is accomplished by substituting for circuit 26 the circuit 41 having an inductive reactance in the shunt leg at frequencies near the low end of the bandpass. Circuit 26 of FIGURE 1 has a capacitive reactance in the passband when trapping adjacent sound. The modified circuit 41 in FIGURE 4 provides a circuit that is series resonant at a frequency just below the trap frequency, and is parallel resonant at a frequency below the resonance of the series circuit in order to have an inductive reactant at frequencies below this parallel resonance.

In place of capacitor 38, a network 42 is provided consisting of a 330 picofarad capacitor 43 and an inductor 44. In this embodiment of the invention, circuit 41 is coupled between tap 25 and a source of AGC reference potential obtained at the junction of a 6.8 kilohm resistor

45 and a 0.001 microfarad capacitor 46. An AGC voltage for the television receiver is obtained through a one kilohm resistor 47 coupled to this junction.

Figure 7:
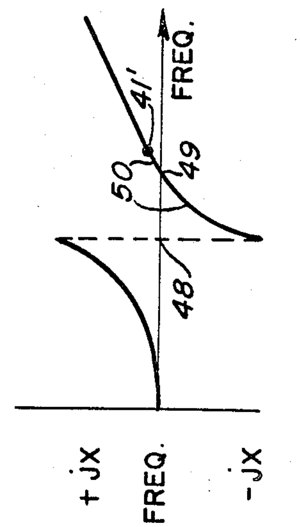
FIGURE 7 is a diagram illustrating the impedance characteristic of the shunt circuit of FIGURE 4.
Figure 6:
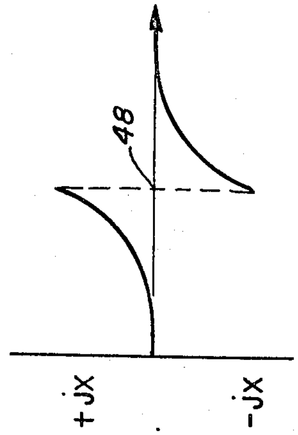
FIGURE 6 is a diagram illustrating the impedance charactertistic of the parallel resonant circuit in the shunt circuit of FIGURE 4.
Figure 5:
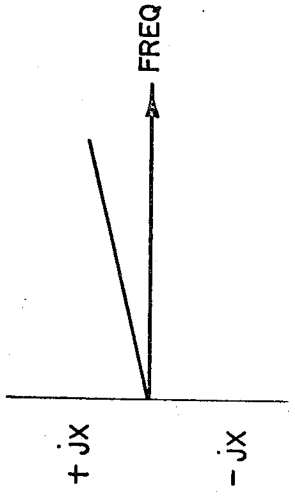
FIGURE 5 is a diagram illustrating the impedance characteristic of the inductor of the shunt circuit of FIGURE 4.

The impedance characteristics of shunt circuit 41 are illustrated in FIGURES 5 to 7. The impedance of inductor 39 increases linearly with frequency, as seen in FIGURE 5. The impedance characteristic of network 42 by itself is seen in FIGURE 6. Inductor 44 is parallel resonant with capacitor 43 at a frequency below the trap frequency, at point 48 on FIGURE 6, e.g., at 45.3 megacycles, so that the total impedance of network 42 is capacitive in the vicinity of the trap frequency.

The impedance characteristic of shunt circuit 41, i.e., series connected inductor 39 and network 42, is illustrated in FIGURE 7. The capacity of network 42 series resonates with inductor 39 at a frequency, point 49 in FIGURE 7, slightly below the trap frequency. This results in a curve 50 characteristic of a series resonant circuit. Inductor 44 is adjusted so that circuit 41 has a small inductive reactance at the trap frequency, point 41' on curve 50 corresponding to point 26' on FIGURE 2, which is just equal to the $-L_M$ reflected in the effective signal path by inductor 24. Thus, near the trap frequency 41', circuit 41 exhibits the characteristic of a series resonant circuit.

Below the parallel resonant frequency 48 of network 42, however, the shunt leg again is inductive. The exact value of inductors 39 and 44 and capacitor 43 is chosen to provide an inductive reactance in the shunt leg which gives the desired bandwidth for network 14 while strongly rejecting the frequency to be trapped.

If desired, the trap may be nulled by making both inductors 39 and 44 adjustable, and fixing the value of the nulling resistor 40. If the values of the variable inductors are alternately adjusted, the trap can be nulled at the frequency to be rejected. Inductor 44 primarily affects trap frequency, while inductor 39 adjusts the null (maximum rejection).

The bandpass network 14 at the input of the IF amplifier traps the adjacent channel sound signal. A similar circuit may be connected between the output of the IF amplifier and the sync-luminance-chrominance-channel of the receiver, tuned to trap the sound signal of the channel being received.

I claim:

1. A bandpass network having a rejection characteristic, comprising: mutually coupled inductances having a common junction point, forming a portion of a bandpass network; first means establishing a reference potential; series and parallel resonant second means coupled between said junction point and said reference potential, forming a series resonant circuit tuned to a frequency slightly below the frequency of a signal to be rejected and a parallel resonant circuit tuned to a frequency below the resonant frequency of the series tuned circuit, said second means having an inductive reactance at the rejection frequency, the effective electrical signal path to the reference potential having a low impedance at the rejection frequency for absorbing said signal, and an inductive reactance at frequencies below said parallel resonance, for affecting the bandwidth characteristics of the bandpass network.

2. A bandpass network having a rejection characteristic, comprising: first means including mutually coupled first inductances having a common junction point, forming a portion of a bandpass network, said junction point being located at a low impedance point on said first inductors; second means establishing a reference potential; series and parallel resonant means including third means coupled between the junction point and said reference potential, including in series a second inductor, and fourth means forming a capacitive reactance at frequencies near the frequency of a signal to be rejected, said series connected second inductor and fourth means forming a series tuned circuit resonant at a frequency below the rejection frequency, the effective electrical signal path, between the bandpass network and the reference potential, having a minimum impedance at the rejection frequency for absorbing said signal, said fourth means comprising a paralleled third inductor and a capacitor, said third inductor and capacitor forming a parallel tuned circuit resonant at a frequency in the bandpass below the resonant frequency of the series tuned circuit, said fourth means having a capacitive reactance at frequencies near the rejection frequency, thereby absorbing the signal to be rejected, and an inductive reactance at frequencies below the resonant frequency of the fourth means.

3. A bandpass network having a rejection characteristic, comprising: mutually coupled inductances having a common junction point, forming a portion of a bandpass network; first means establishing a reference potential; series and parallel resonant second means coupled between the junction point and said reference potential, including a second inductor connected in series with third means forming a capacitive reactance at frequencies near the frequency of a signal to be rejected, said series connected second inductor and third means forming a series resonant circuit tuned to a frequency slightly below the frequency of said signal, said second means having a positive inductive reactance at the frequency of said signal that is substantially equal to the negative inductive reactance reflected by the mutually coupled inductances in the effective electrical signal path to said reference potential, for absorbing said signal, said second inductor and said third means being variable providing both a frequency and a null adjustment to obtain maximum rejection at the frequency of said signal.

4. The network of claim 3 wherein said third means includes a paralleled third inductor and a capacitor, said third inductor being variable to provide the variable adjustment of said third means.

References Cited

UNITED STATES PATENTS

| | | | |
|---|---|---|---|
| 2,907,960 | 10/1959 | Avins | 333—76 |
| 3,114,889 | 12/1963 | Avins | 333—76 |
| 3,358,246 | 12/1967 | Bensasson | 333—76 |
| 2,183,741 | 12/1939 | Grundmann | 333—70 |
| 3,074,026 | 1/1963 | Kuzminsky | 330—144 |
| 3,217,096 | 11/1965 | Caprio | 178—5.8 |

HERMAN K. SAALBACH, *Primary Examiner.*

C. BARAFF, *Assistant Examiner.*

U.S. Cl. X.R.

178—5.8, 5.4; 325—477; 333—6